UNITED STATES PATENT OFFICE.

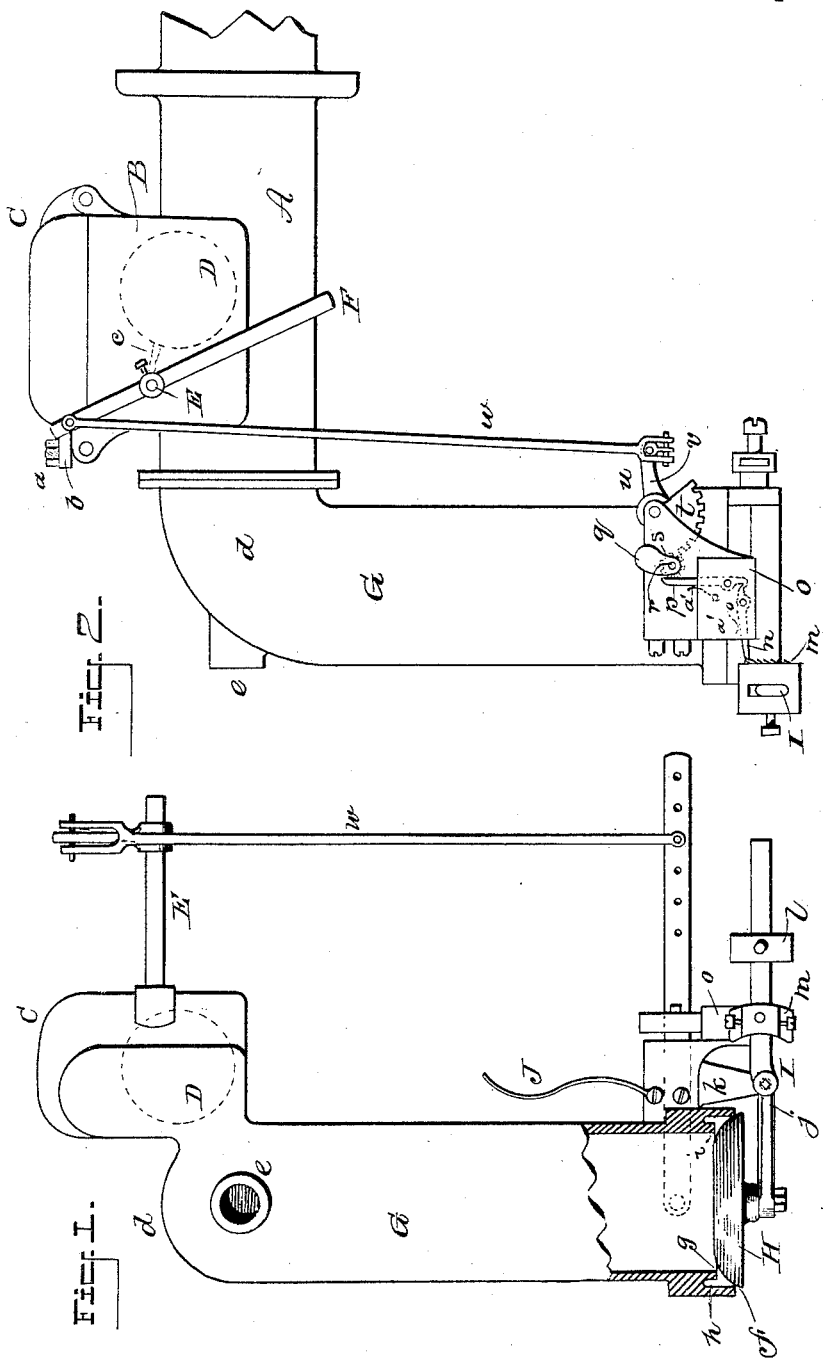

CHARLES H. SHEPHERD, OF NEW YORK, N. Y.

VALVE.

SPECIFICATION forming part of Letters Patent No. 424,580, dated April 1, 1890.

Application filed March 5, 1889. Serial No. 301,976. (No model.)

*To all whom it may concern:*

Be it known that I, CHARLES H. SHEPHERD, of the city, county, and State of New York, have invented new and useful Improvements in Valves, of which the following is a specification, reference being had to the annexed drawings, forming a part thereof, in which—

Figure 1 is a front elevation, partly in section, of my valve improvement; and Fig. 2 is a side elevation.

Similar letters of reference indicate corresponding parts in both views.

The object of my invention is to provide simple and effective means for preventing the accumulation of débris upon the valve between the valve and valve-seat.

My invention consists in the combination of a valve having a convex face with a pipe having a valve-seat upon the end thereof, and having an annular ledge extending toward the face of the valve without touching it.

My invention also consists in the particular construction and arrangement of parts, as hereinafter fully described.

My present invention is especially designed for use in connection with the outlet of a house-pipe, the valve being arranged to discharge into a catch-basin.

The horizontal pipe-section A, which forms a part of the sewerage system of a building, is provided with a float-chamber B, having a hinged cover C, fastened with the swing-bolt $a$, which is capable of swinging into a slot in the ear $b$, projecting from the edge of the cover. The turning down of the nut upon the bolt secures the cover. In the said float-chamber is placed a float D, as shown in dotted lines, which is connected by an arm $c$, with the rock-shaft E, extending through the wall of the float-chamber and carrying a lever F, the said lever being connected to the valve-operating mechanism, as will presently be described.

To the end of the pipe-section A is attached a vertical pipe G, provided with an elbow $d$, at the upper end thereof, for forming a connection with the pipe A. The said vertical pipe G is provided with a horizontal branch $e$ for the insertion of pipe-cleaning devices. The lower end of the pipe G is enlarged and provided with a valve-seat $f$, within which is located an annular ledge $g$, which is separated from the valve-seat by an annular space $h$.

To the valve-seat $f$ is fitted the valve H, having a convex face, which touches the angle of the valve-seat $f$ when the valve is closed, said valve extending upward into the pipe toward the ledge $g$, but without touching the said ledge, leaving a narrow annular space $i$. By this construction when the valve H is nearly closed upon its seat the ledge $g$ catches and holds any matter that might interfere with the perfect closing of the valve.

The valve H is mounted upon one arm $j$ of the lever I, which is pivoted upon a bracket $k$, formed on or attached to the side of the pipe G, the other arm being provided with a counter-weight $l$, and with a spring-supported ratchet $m$, which is adapted to be engaged by the catch-lever $n$, pivoted in the box $o$, attached to the bracket $k$, and the said lever $n$ is engaged by a second catch-lever $p$, which reaches upward at right angles to the lever $n$, the long arm of the said catch-lever $p$ being in position to be engaged by a cam $q$ on the shaft $r$. The said shaft $r$ carries a pinion $s$, which is engaged by a sector-lever $t$ on the rock-shaft $u$. The rock-shaft $u$ is provided with an arm $v$, which is connected by the rod $w$ with the lever F.

The operation of my improved valve is as follows: When the pipe G and the pipe-section A become filled, so that the float D is lifted, the shaft E is turned, the rod $w$ is carried downward, thus turning the shaft $u$, which, through the sector $t$, imparts motion to the pinion $s$, turning the shaft $r$ and cam $q$, attached thereto, moving forward the longer arm of the lever $p$, disengaging the lever $n$, thus releasing the ratchet $m$ and allowing the valve H to fall and discharge the contents of the pipe. As the valve drops, the motion imparted to the lever I is arrested by a spring J, attached to the bracket $k$. As soon as the pipe G is emptied, the valve H is returned to its seat by the counter-weight $l$, and is locked in a closed position by the engagement of the spring-pressed ratchet $m$ with the catch-lever $n$. The float D having returned to its normal position, the catch-levers $p$ $n$ are returned to their normal positions by springs $a'$.

Having thus described my invention, I claim as new and desire to secure by Letters Patent—

1. The combination, with the valve-seat $f$, provided with the ledge $g$ and annular space $h$, of the convex valve H, adapted to close against the valve-seat $f$ without touching the ledge $g$, substantially as described.

2. The combination, with the float-chamber B, of the hinged cover C, provided with the slotted ear $b$, and the swing-bolt $a$, substantially as specified.

CHARLES H. SHEPHERD.

Witnesses:
 GEO. M. HOPKINS,
 C. SEDGWICK.